United States Patent
Wylezinski et al.

[11] Patent Number: 5,904,364
[45] Date of Patent: May 18, 1999

[54] FOLDING FRAME LOG TRAILER

[75] Inventors: Andrzej T. Wylezinski; James H. Wilfore, both of Jasper, Ala.

[73] Assignee: Fontaine Trailer Co., Haleyville, Ala.

[21] Appl. No.: 08/700,963

[22] Filed: Aug. 21, 1996

[51] Int. Cl.$^6$ ........................................ B62B 63/00
[52] U.S. Cl. ................ 280/401; 280/425.2; 414/483; 414/563
[58] Field of Search ........................ 280/401, 402, 280/423.1, 425.2, 441.2, 404, 656; 414/563, 482, 483

[56] References Cited

U.S. PATENT DOCUMENTS

| | | | |
|---|---|---|---|
| 489,272 | 1/1893 | Smith . | |
| 1,505,144 | 8/1924 | Herbert et al. . | |
| 2,034,842 | 3/1936 | Stratton | 214/65 |
| 2,112,201 | 3/1938 | Larison | 214/65 |
| 2,151,343 | 3/1939 | Alexander | 280/142 |
| 2,233,697 | 3/1941 | Freitag | 214/85 |
| 2,296,858 | 9/1942 | Larison | 214/85 |
| 2,590,388 | 3/1952 | Dornath | 280/33.2 |
| 2,646,178 | 7/1953 | Alvare | 214/38 |
| 3,439,934 | 4/1969 | Murie et al. | 280/150.5 |
| 3,602,384 | 8/1971 | Warren | 280/423.1 |
| 3,706,464 | 12/1972 | Burrows et al. | 280/401 |
| 5,110,149 | 5/1992 | Dahlstrom | 280/401 |

FOREIGN PATENT DOCUMENTS

| | | | |
|---|---|---|---|
| 137444 | 4/1948 | Australia | 93/1 |
| 1139417 | 1/1969 | United Kingdom | 280/425.2 |

*Primary Examiner*—Anne Marie Boehler
*Attorney, Agent, or Firm*—Rudnick & Wolfe

[57] ABSTRACT

A folding frame trailer is provided which includes a rear frame assembly having a front portion and a rear portion, a neck frame assembly having a front portion, a rear portion, the rear portion pivotally coupled to the front portion of the rear frame assembly, a jackleg, and an upper coupler assembly pivotally to the front portion of the neck frame assembly, whereby the jackleg is used for jacking the trailer during the folding and unfolding operations. The trailer further includes a suspension slider, and push tubes connected to the suspension slider and the central two bolster assemblies, whereby the cent bolster assemblies fold down upon the forward movement of the slider suspension with respect to the trailer.

15 Claims, 7 Drawing Sheets

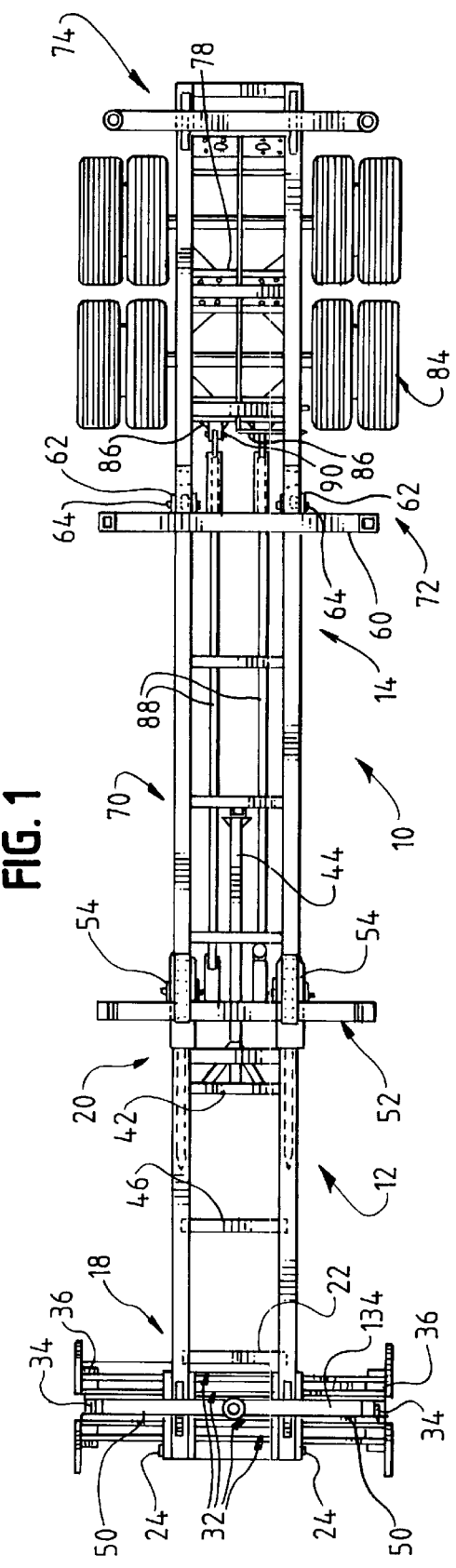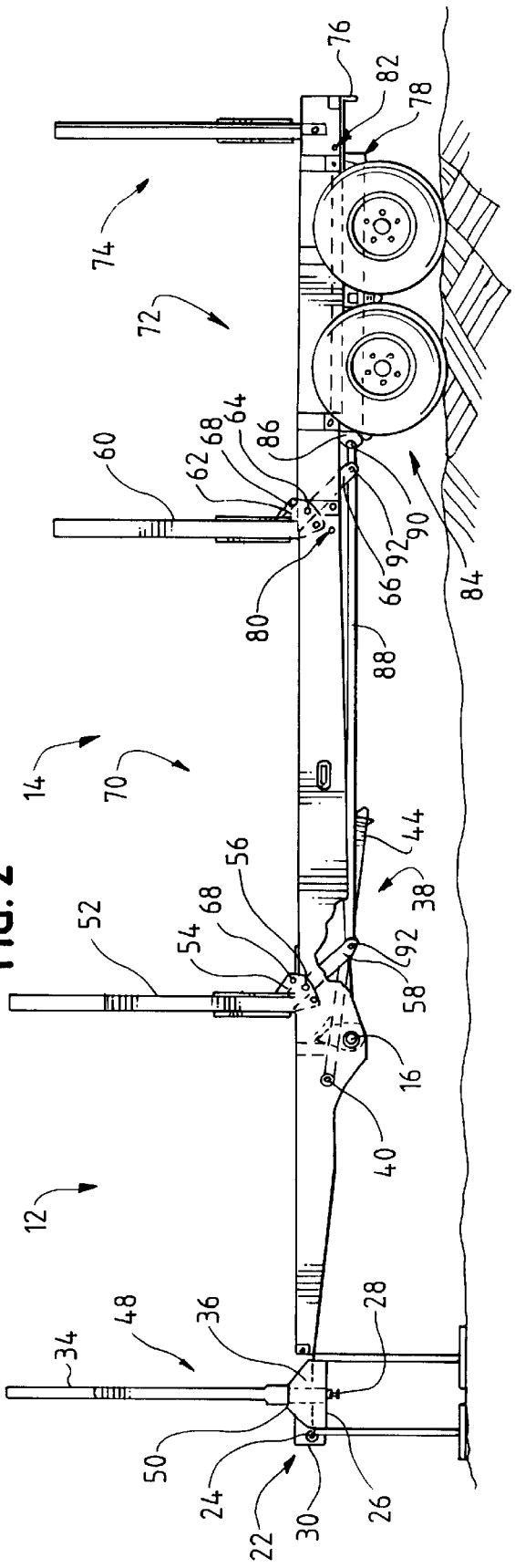

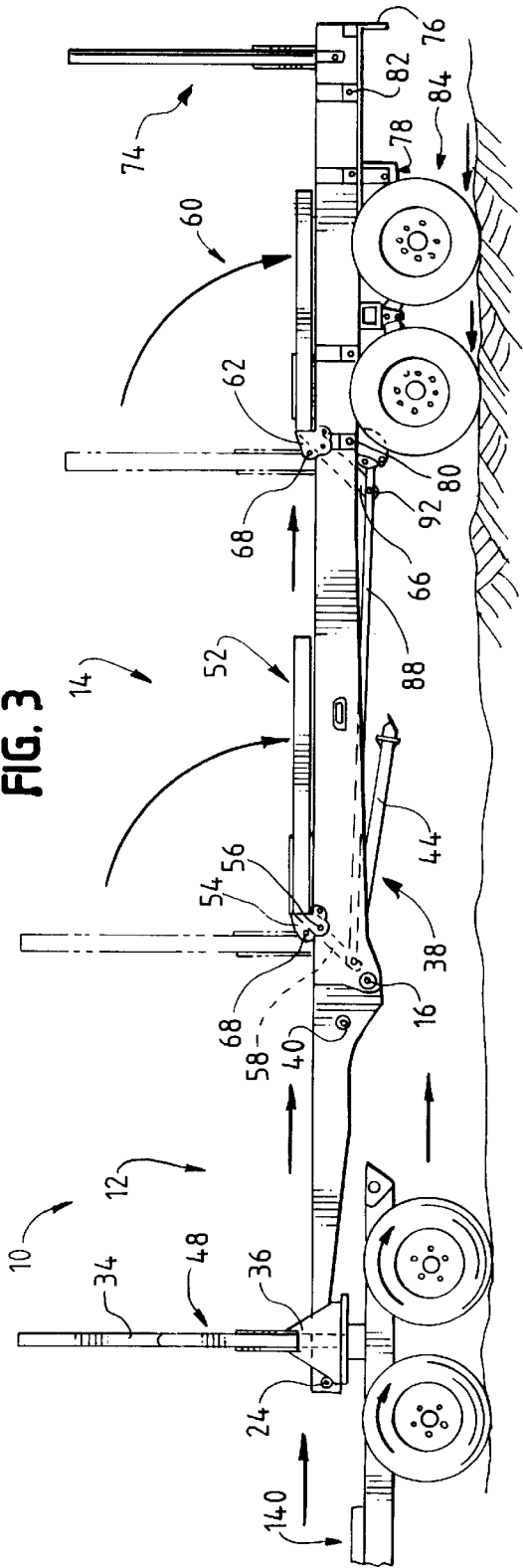
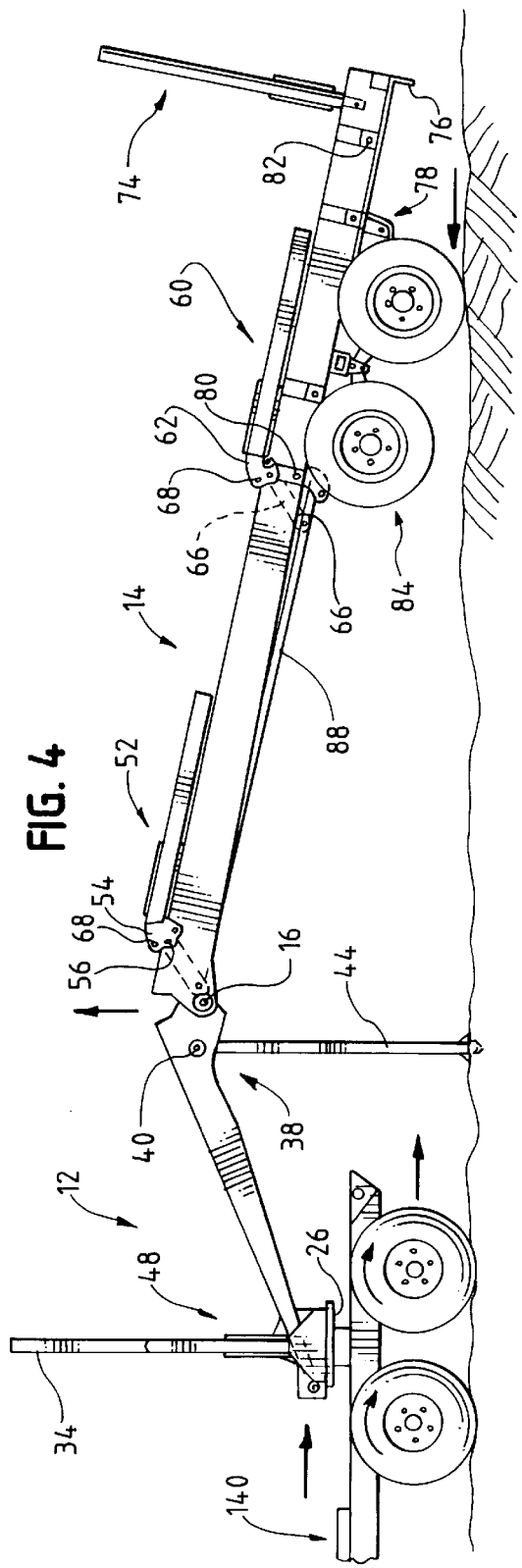

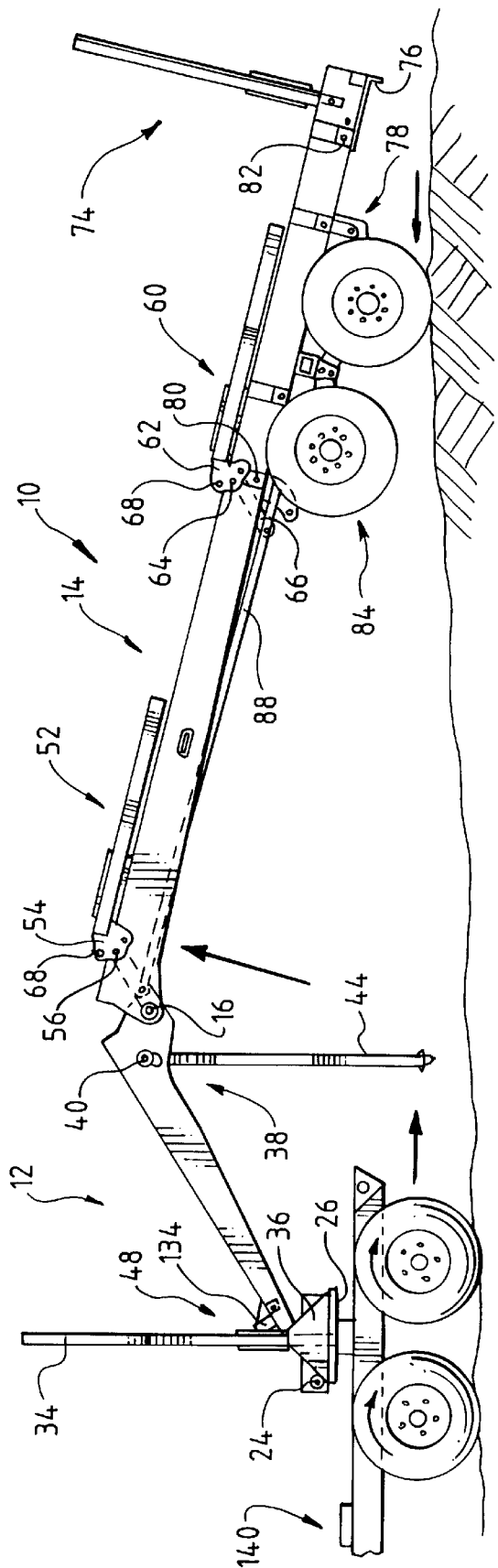

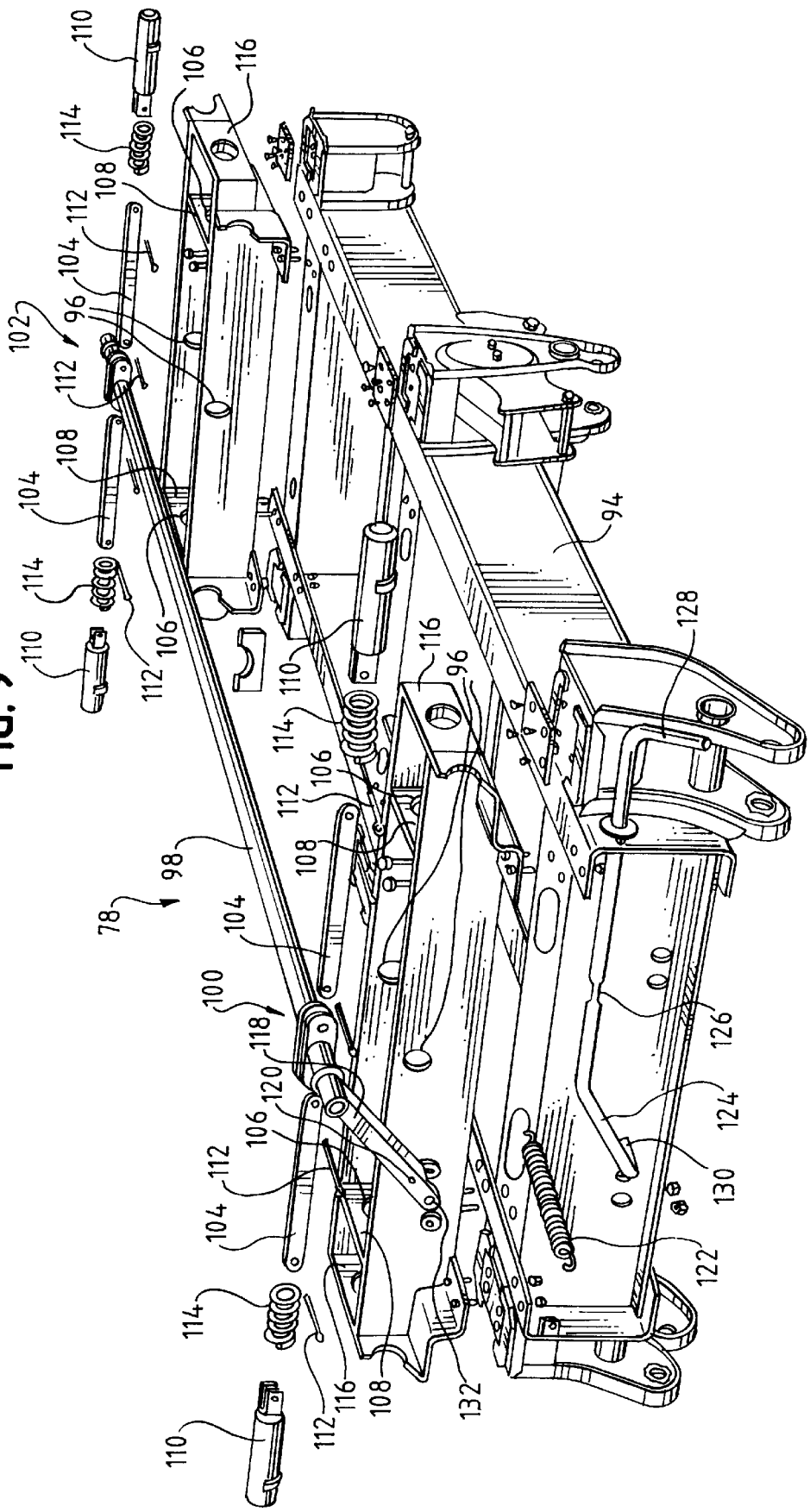

FOLDING FRAME LOG TRAILER

BACKGROUND OF THE INVENTION

The present invention relate to Folding Frame Trailers, and, particularly, to folding frame trailers for the logging industry.

In the logging industry, two basic types of trailers are currently used for transporting various forms of round wood. These are frame and pole trailers. The former are designed to support loads at intermediate points between the king pin and the trailer running gear. Therefore, they are extremely versatile—as they can be used to transport any form of round wood: i.e., shortwood, logs, treelengths and full trees. Also, greater payloads are possible due to various loading styles as well as better control over axle weight distribution. Pole trailers have only two bolsters and two sets of standards. The first bolster is usually located over the king pin, approximately just over the midpoint of the tractor tandem. The second bolster is mounted right above the trailer tandem midpoint. A heavy pole connects the trailer upper coupler and the front bolster with the trailer tandem. The whole simplicity of the pole trailer design lies in the fact that the payload's weight is conveyed directly to the road. The pole serves only as a coupling and does not bear any weight of the logs. Consequently, this type of a trailer is about 3,000 pounds lighter than a frame trailer. Therefore, a reduced tare weight can be utilized for an increased payload. Also, there is a proportionally lower purchase investment. However, the practice has demonstrated that pole trailers haul lower average payloads than frame trailers. Also, pole trailers are unable to carry shortwood and logs. The foregoing describes the main reasons for which frame trailers outnumber pole trailers.

Trailers used in the logging industry do not carry any loads during a return trip to the woods. The return ride is very rough on the driver due to less weight on the drive tandem of the truck and large inertia forces exerted on the trailer. Also, trailer off-tracking and its tendency to jack knifing in case of sudden braking contribute to increased driver's fatigue. As a result, folding pole trailers are quite common. Folding pole trailers can be folded and carried on the tractor for the return trip. The advantages include a lower brake and tire maintenance cost, lower fuel consumption, greater maneuverability, and quicker turn-around times. However, recently, the popularity of the folding pole trailer seems to diminish due to an increased perception of the trailer as a dangerous piece of equipment. This stems primarily from allegedly increased number of rear end collisions in which passengers of the other vehicle were killed or severely injured due to an intrusion of the pole into the passengers compartment. In the latest development, state legislatures in some parts of the United States are preparing bills to ban pole log trailers on public roads. An example of this type of folding pole trailer can be seen on U.S. Pat. No. 3,706,464.

U.S. Pat. No. 2,296,858, discloses a folding trailer attached to a truck by a foldable connection adapted to facilitate the loading of the trailer onto the truck.

The folding frame log trailer of the present invention seeks to overcome the foregoing noted disadvantages of the prior art.

SUMMARY OF THE INVENTION

It is an object of the present invention to provide a folding frame trailer without the safety problems of the pole trailer.

It is a further object of the invention to provide a folding frame trailer which combines the versatility of a frame design with the advantageous feature of self-loading.

It is a feature of the present invention to provide a folding frame trailer which allows greater fuel efficiency of the tractor, requires reduced maintenance and provides improved traction.

It is a feature of the present invention to provide a folding frame trailer for improved maneuverability, and quicker turn-around times, and consequently increased productivity of a logging operation.

It is still a further feature of the present invention to provide a folding frame trailer which avoids fatigue failure of the trailer.

The present invention therefore provides a folding frame trailer which includes a rear frame assembly having a front portion and a rear portion. The trailer further includes a neck frame assembly having a front portion and a rear portion. The rear portion of the neck frame assembly is pivotally coupled to the front portion of the rear frame assembly. The neck frame assembly further includes means for jacking, and an upper coupler assembly pivotally connected to the front portion of the neck beam, whereby the jack means is used for jacking the trailer during the folding and unfolding operations.

The present invention further provides a folding frame trailer, which includes a rear frame assembly having a front portion and a rear portion. The folding frame trailer further includes a neck frame, assembly having a front portion, and a rear portion. The rear portion of the neck frame assembly is pivotally coupled to the front portion of the rear frame assembly. The neck frame assembly further includes an upper coupler assembly pivotally coupled to the front portion of the neck frame assembly, at least one bolster assembly pivotally connected to the trailer, means for pushing coupled to at least one bolster assembly; and means for activating coupled to the pushing means.

BRIEF DESCRIPTION OF THE DRAWINGS

FIG. 1 is a top view of the folding frame trailer, constructed in accordance with the present invention, in an unfolded position;

FIG. 2 is a side view of the trailer of FIG. 1;

FIG. 3 is a side view of the trailer of the present invention coupled to a truck and in the stage of folding down the two center bolster assemblies;

FIG. 4 is a side view of the trailer and a truck in the stage of breaking the trailer with the jackleg engaging the ground surface;

FIG. 5 is a side view of the trailer and the truck of FIG. 4 in a further elevated position during the folding operation;

FIG. 9 is an exploded view of the slider suspension used in one embodiment of the trailer of the present invention.

MODE FOR CARRYING OUT THE INVENTION

Figure 6:
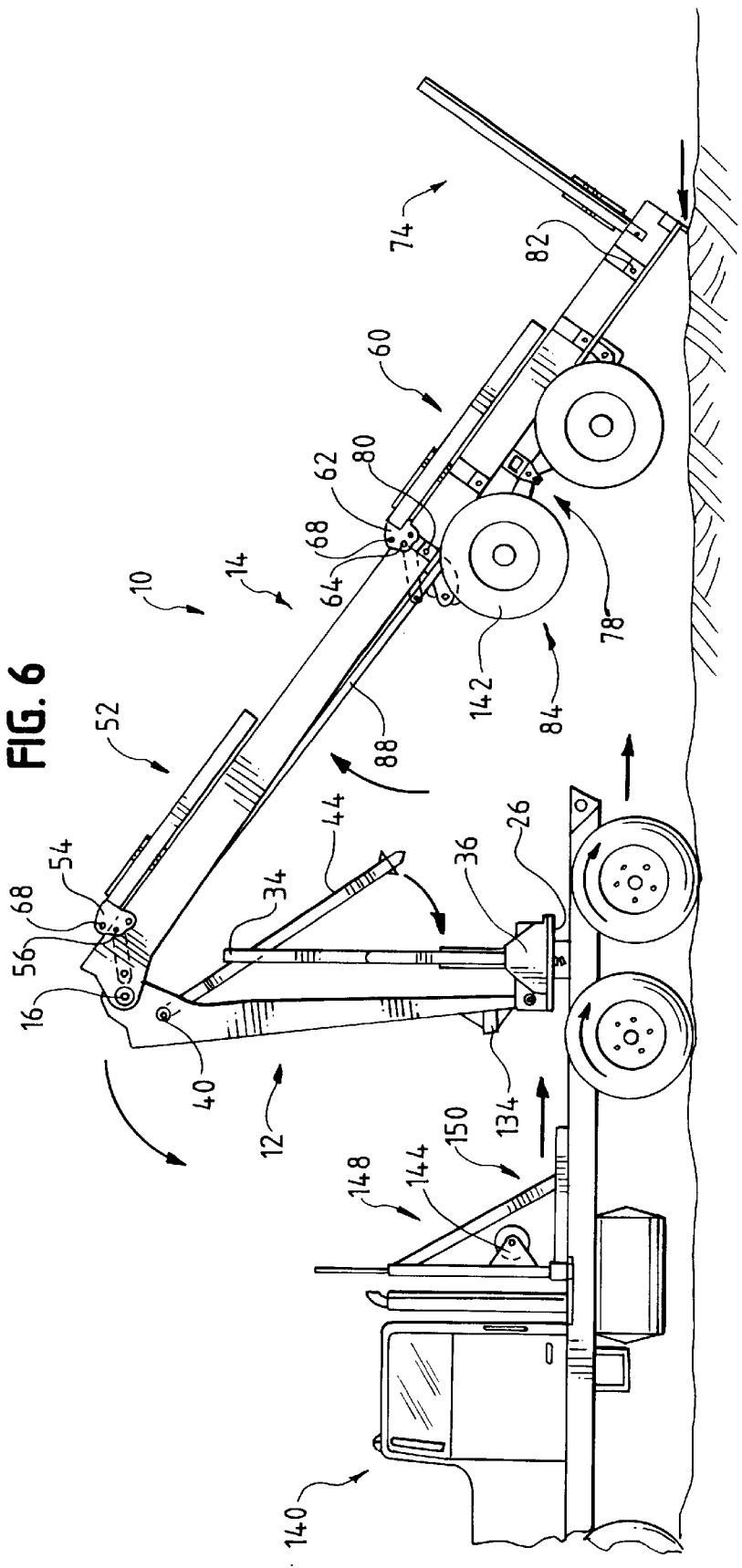
FIG. 6 is a side view of the trailer and the truck of FIG. 5 with the trailer elevated to the highest position during the folding operation.

Referring now to FIGS. 1 and 2 there is illustrated a folding frame trailer 10 having a neck frame assembly 12 and a rear frame assembly 14. A hinge pin 16 is shown pivotally connecting the neck frame assembly 12 to the rear frame assembly 14. The neck frame assembly 12 includes a front portion 18 and a rear portion 20. An upper coupler assembly 22 is pivotally coupled at the front of the neck frame assembly 12 with pivot shafts 24. The upper coupler assembly 22 comprises a king pin plate 26, a king pin 28, a glad hand plate 30, reinforcing tubular cross members 32 and two front stakes 34 with braces 36. A jack leg assembly 38 is pivotally connected to the rear portion 20 of the neck frame assembly 12 with two pins 40. The jack leg assembly 38 includes a shaft tube 42 and a jack leg 44. The jack leg assembly 38 is free to rotate about the pivot pins 40 and can be held in the storage position of FIG. 2, using conventional means such as a chain tie down (not shown). The neck frame assembly 12 has a cross member 46 in a midsection area. A front or first bolster beam 134 is mounted onto the neck frame assembly 12 and has two bolster clips 50 to engage with the front stakes 34 in an unfolded position. A front central or second bolster assembly 52 includes bolster hinge plates 54 pivotally connecting the second bolster assembly 52 to the rear frame assembly 14 with pivot shafts 56. The second bolster assembly 52 includes two crank arms 58, for folding operation.

Similarly, a rear central or third bolster assembly 60 includes hinge plates 62 pivotally connecting the third bolster assembly 60 with the rear frame assembly 14 with pivot shaft 64. The third bolster assembly 60 includes crank arms 66. The second and third bolster assemblies 52, 60 a shown in their upright a unfaded positions. The second and third bolster assemblies are locked in either the upright or folded positions using bolster lock pins 68 extending through the bolster hinge plates 54, 62.

The rear frame assembly 14 includes a front portion 70 and a rear portion 72. A rear or fourth bolster assembly 74 is mounted at the rear of the rear frame assembly 14. Grousers 76 are mounted at the rear bottom of the rear frame assembly 14. As it will be described in greater detail below, the rear portion 72 of the rear frame assembly 14 houses a slider suspension assembly 78. The slider suspension assembly 78 is capable of movement along the longitudinal axis of the trailer 10 between a forward position and a rearward position. A front slider stop bar 80 is connected to the trailer 10 for engagement with a front portion of the slider suspension assembly 78 at the forward position. A rear slider stop bar 82 is connected to the rear frame assembly 14 for engagement with a rear portion of the slider suspension assembly 78 at the rearward position. Trailer springs, axle, brake and wheel assemblies 84 are secured to the moveable slider suspension assembly 78.

The above-noted slider suspension assembly 78 includes push tube brackets 86, pivotally coupled to bolster push tubes 88 respectively, using push tube pins. The front end of the bolster push tubes 88 are pivotally coupled to the crank arms 58 of the second bolster assembly 52 using pins 92. A rear portion of the bolster push tubes 88 are similarly pivotally coupled to the crank arms 66 of the third bolster assembly 60 using same pins 92.

The slider suspension assembly 78 is shown in FIG. 9. The suspension springs, axles, brake and wheel assemblies 84, (not shown) are mounted at the bottom of the slider frame 94. The slider frame 94 is designed to be mounted inside of the rear frame assembly 14 and to move along a longitudinal axis of the trailer between the forward position and rearward position.

The upper of the slider frame 94 includes rod openings 96 wherein a rod 98 extends therethrough. The rod 90 includes a front and rear connecting flange assembly 100, 102 from which each extend linkage 104 through a linkage opening 106 of an inner plate 108. The outer end of each linkage 104 is connected to a locking pin 110 with a pin 112. Springs 114 are located between the inner plates 108 and outer plates 116 and exert pressure outwardly against the locking pins 110.

The locking pins 110 are used to engage with first and second locking holes (not shown) of the rear frame assembly 14 so as to lock the slider suspension assembly 78 in the forward position or rearward position.

The front connecting flange 100 of the suspension slider 78 assembly includes a lever 118 having spring attachment means 120. A safety spring 122 is connected to the spring attachment means 120 and the slider frame 94. The safety spring 122 maintains an outwardly directed force on the locking pins 110 for additional safety.

A release bar 124 is slideably secured to the slider suspension assembly 78 and includes a stamped notch 126 and a handle 128. The end 130 of the bar 124 is secured to the opening 132 of the lever 118. Outward movement of the handle 128 causes rotation of the rod 98 which in turn causes inwardly directed movement of the linkages 104 and the locking pins 110 so as to unlock the slider suspension assembly 78 from the rear portion 72 of the rear frame assembly 14 for longitudinal movement of the slider suspension assembly 78. With the slider suspension assembly 78 in the forward position or rearward position, inward movement of the handle 128 causes the locking pins 110 to move outwardly so as to lock with the locking holes (not shown) of the rear portion 72 of the rear frame assembly 14.

Operation of the trailer 10 can be described as follows. The trailer is used to haul a load with the second and third bolster assemblies 52, 63 in the upright positions shown in FIGS. 1 and 2, and the slider suspension assembly 70 in the rearward position with the locking pins 110 engaging holes (not shown) in the webs of the rear frame assembly 14. The rear slider stop bar 82 ensures that the locking pins align the holes.

The front or first bolster assembly 48 is designed as a twin bolster where a bolster beam 134 (shown in FIG. 5 through FIG. 8) is mounted directly on the neck frame assembly 12 and the front stakes 34 in turn are mounted directly to the upper coupler assembly 22. Since the bolster beam 134 moves relative to the upper coupler assembly 22 during the trailer folding operations the bolster clips 50 are used to die the bolster beam 134 with the front stakes 34 in the unfolded position. In addition, the neck frame assembly 12 is secured to the upper coupler assembly 22 using left and right lie-down chains (not shown) and chain-trap plates 135 (shown in FIG. 7).

Referring now to FIG. 3, the bolster lock pins 68 are removed from the bolster hinge plates 54, 62 and the handle 128 of the slider suspension assembly 78 is pulled outwardly so as to disengage the lack pins 110 from the rear frame assembly 14. With the trailer brakes on, the tractor 140 is moved backwards so as to move the trailer 10 rearwardly with the slider suspension assembly 78 held stationery with the application of the trailer brakes The trailer 10 is moved backwards until the slider suspension assembly 78 is in the forward position relative to the rear frame assembly 24.

As the slider suspension assembly 70 moves forward relative to the rear frame assembly 14, the bolster push tubes 88 similarly move along a longitudinal axis in a forward direction with respect to the rear frame assembly 14 as the push tubes 8 exert a forward force on the crank arms 58, 66 so as to fold the second and third bolster assemblies 52, 60 as shown in FIG. 3. The bolster lock pins 60 are replaced in each of the hinge plates 54, 62 so as to lock the second and third bolster assemblies 52, 63 in place in order to avoid fatigue during transport.

The handle 128 of the slider suspension assembly 78 is then released and moves inwardly under the force of the safety spring 122 so as to lock the locking pins 110 into engagement with the rear frame assembly 14.

Referring now to FIG. 4, with the second and third bolster assemblies 52, 60 secured in the folded position and the slider suspension assembly 78 secured in the forward position, the jack leg 44 is unlocked from the trailer 10 using any conventional locking or securing means (not shown) and the end of the jack leg 44 is lowered to the ground. The tractor 140 moves backwards, while the trailer brakes are disengaged, whereby the jack leg 44 digs into the ground and initiates folding of the trailer by causing upward movement of the neck and rear frame assemblies 12, 14. Once folding of the frame 10 has been initiated the driver starts to apply trailer brakes again.

With reference to FIG. 5, the folding operation continues with the driver driving the tractor 140 backwards with the trailer brakes on. It is noted at this point that the jack leg 44 has been raised off of the ground surface. As the rear frame assembly 14 tilts, the grousers 76 move towards the ground.

The driver continues driving the tractor 140 backwards and under the tractor 10 as shown in FIG. 6 as the tractor 140 moves closer to the front tires 142 of the trailer. FIG. 6 shows the trailer 10 in the highest elevated position.

Figure 7:
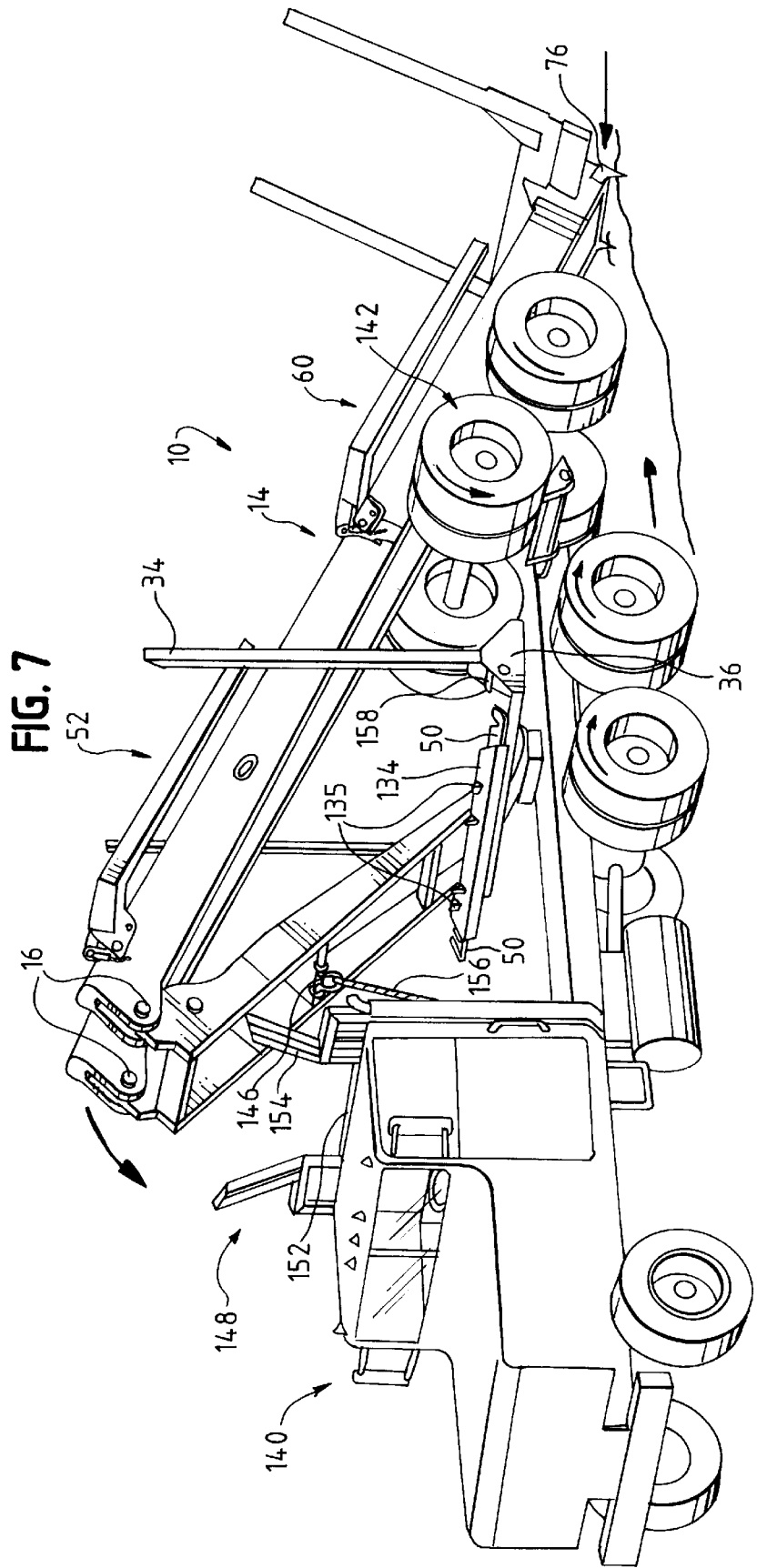
FIG. 7 is a perspective view of the trailer and the truck during the stage of loading the trailer onto the truck.
Figure 8:
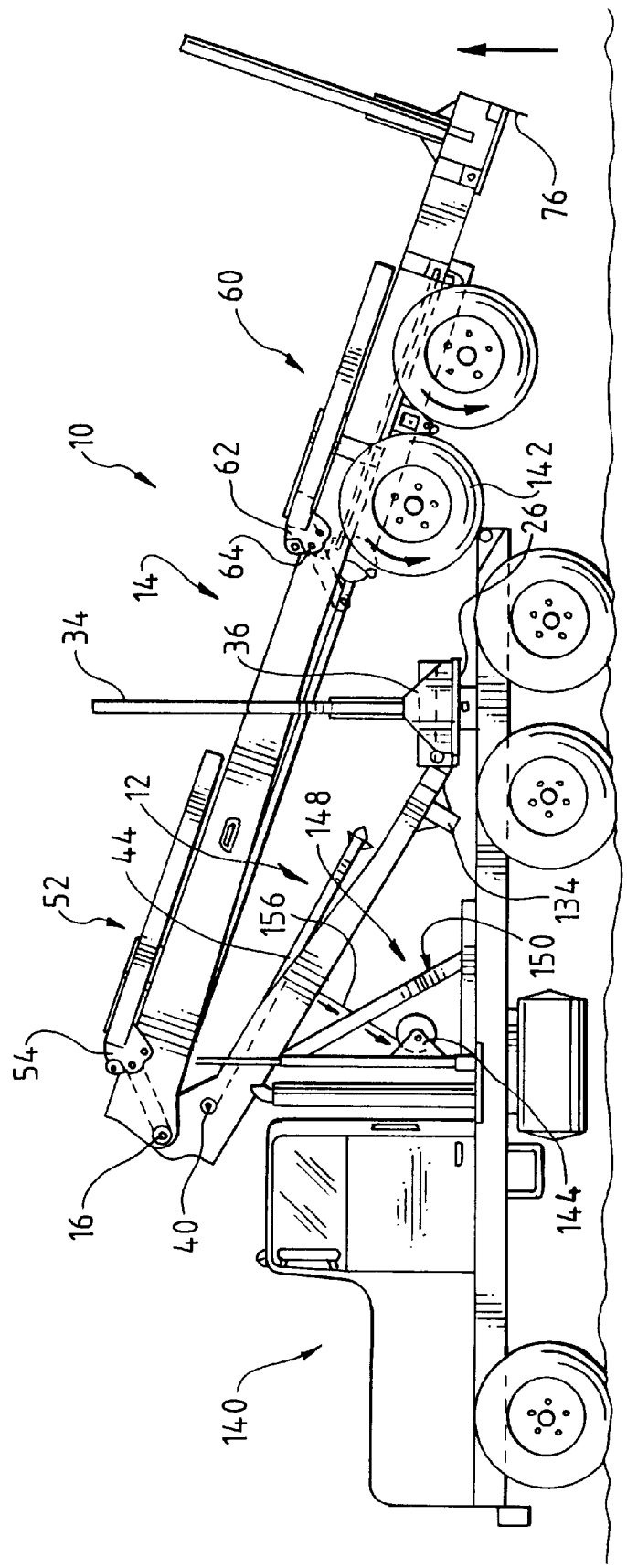
FIG. 8 is a side view of the trailer and the truck in the final loaded stage.

FIGS. 6 and 7 also show the engagement of the grouser 76 of the trailer 10 with the ground surface so as to stabilize any movement of the trailer 10. A winch cable 156 of the tractor 140 is secured to a D-ring 146 mounted on the cross member 46 of the neck frame assembly 12 and is used to pull the trailer 10 onto the headache rack 148 of the tractor 140. Chains (not shown) are used now to tie down the trailer 10 to the tractor 140 for a return trip loaded.

The headache rack 148 includes a main support structure 150 which carries a horizontal load bearing member 152, and left and right upright members 154.

The unfolding operation of the trailer is as follows. First, the driver uncouples the chain tie-downs and winch cable 156. Then, the trailer brakes are released and by a quick forward movement of the tractor 140, the trailer 10 is dropped off of the tractor and onto the ground. The grouses 76 mounted at the rear of the rear frame assembly 14 catch the ground and assist the unloading operation. The driver now drives the tractor 140 from under the trailer 10. In a final stage, the freely pivoting jack leg 44 engages the ground surface so as to assist in the final unfolding of the trailer 10.

With the trailer 10 completely unfolded, the jack leg 44 is raised and secured to the trailer 10. The bolster lock pins 68 are removed from the bolster hinge plates 54, 62, and the slider suspension handle 128 is retracted so as to unlock the slider suspension assembly 78 from the trailer 10. The driver then moves the truck forward while the trailer brakes are applied whereby the reactive movement of the slider suspension assembly 78 52, 60 to raise or unfold. In order to avoid fatigue damage of the folding mechanism, the bolster assembles 52, 60 are locked in the vertical position with the bolster lock pins 68. The slider suspension assembly 70 is secured in the rearward position by releasing the locking pins 110 of the slider suspension assembly 78 using the handle 128. Finally, the upper coupler assembly 22 is secured to the neck frame assembly 12 using the chains (not shown) and chain-trap plates 135. The bolster clips 50 on the bolster beam 134 engage the front stakes 34 for increased stake strength. The upper coupler assembly 22 includes bolster clip pins 158 which receive the bolster clips 50 (shown in FIG. 7) in the unfolded position.

We claim:

1. A folding frame trailer, comprising:
   a rear frame assembly having a front portion and a rear portion;
   a neck frame assembly having a front portion and a rear portion, the rear portion pivotally coupled to the front portion of the rear frame assembly;
   a jack leg pivotally coupled to the folding frame trailer;
   a slider suspension at the rear portion of the rear frame assembly, the slider suspension having a frame assembly slidably connected to the rear portion of the rear frame assembly, the slider suspension capable of movement, with respect to the trailer, along the longitudinal axis of the trailer;
   means for locking the slider suspension with the rear frame assembly in a forward position and a rearward position;
   means for disengaging the locking means;
   a grouser attached at the rear of the rear frame assembly; and
   an upper coupler assembly pivotally connected to the front portion of the neck frame assembly.

2. The folding frame trailer of claim 1, wherein the jack leg has one end pivotally connected to the rear portion of the neck frame assembly.

3. The folding frame trailer of claim 1, further comprising a shaft tube pivotally connected to the rear portion of the neck frame assembly and the jack leg having one end connected to the shaft tube.

4. The folding frame trailer of claim 1, wherein the neck frame assembly further comprises a cross member connected to a mid-section of the neck frame assembly.

5. The folding frame trailer of claim 1, further comprising a hinge pin pivotally coupling the rear portion of the neck frame assembly to the front portion of the rear frame assembly, and a pivot shaft coupling the upper coupling assembly to the front portion of the neck frame assembly.

6. The folding frame trailer of claim 1, further comprising:
   a front slider stop bar secured to the rear frame assembly forward of the slider suspension to stop the slider in the forward position;
   rear slider stop bar secured to the rear frame assembly behind the slider suspension to stop the slider in the rearward position; and
   means for securing the neck frame assembly with the upper coupling means in an unfolded locked position.

7. The folding frame trailer of claim 6, wherein the securing means includes a trap plate.

8. The folding frame trailer of claim 1, further comprising:
   a front bolster beam mounted at the front of the neck frame assembly;
   a second bolster assembly pivotally coupled to the rear frame assembly;
   a third bolster assembly pivotally coupled to the rear frame assembly; and
   a means for pushing the second bolster assembly and the third bolster assembly connected to the frame of the slider suspension, whereby the second and third bolster assemblies fold down upon forward movement of the slider assembly.

9. The folding frame trailer of claim 8, wherein the second and third bolster assemblies include crank arms, the pushing means includes push tubes pivotally connecting to the crank arms of the second and third bolster assemblies and the suspension slider assembly.

10. The folding frame trailer of claim 8, further comprising:
   a left and right front stake mounted at the front of the neck frame assembly;
   bolster clip pins mounted at the left and right front stakes for receiving the bolster clips.

11. The folding frame trailer of claim 1, wherein the neck frame assembly further comprises a tubular cross member in a mid-section of the neck frame assembly.

12. The folding frame trailer of claim 1, further comprising at least one bolster assembly pivotally connected to the trailer, the at least one bolster assembly includes a first crank arm and a second crank arm, and the push means includes a first push tube having one end connected to the activating means and a second end connected to the first crank arm, and a second push tube having one end connected to the activating means and a second end connected to the second crank arm.

13. The folding frame trailer of claim 12, wherein the at least one bolster assembly includes a first and second hinge plate, the first crank arm connected to the second bolster, the second crank arm connected to the third bolster, the first and second hinge plates pivotally connected to the trailer, and includes means for locking the at least one bolster assembly in a folded position and an unfolded position, and the activating means comprises a slider suspension at the rear portion of the rear frame assembly, the slider suspension having a frame assembly slideably connected to the rear portion of the rear frame assembly, the slider suspension capable of movement with respect to the trailer, along a longitudinal axis of the trailer, the one end of the first and second push tubes are connected to the frame assembly of the slider suspension.

14. The folding frame trailer of claim 13, further comprising a hinge pin pivotally coupling the rear portion of the neck frame assembly to the front portion of the rear frame assembly, and a pivot shaft coupling the upper coupling assembly to the front portion of the neck frame assembly.

15. A folding frame trailer, comprising:
   a rear frame assembly having a front portion and a rear portion;
   a neck frame assembly having a front portion and a rear portion, the rear portion pivotally coupled to the front portion of the rear frame assembly;
   a jack leg pivotally coupled to the folding frame trailer;
   an upper coupler assembly pivotally connected to the front portion of the neck frame assembly; and
   a tractor rack for receiving and securing the trailer in the folded position, the tractor rack having a main support structure, a horizontal load bearing member, and left and right upright members, the upright members are spaced apart a distance greater than the width of the trailer and extend upwardly and outward, whereby the folded trailer is received between the upright members and secured in abutment with the horizontal load bearing member.

* * * * *